United States Patent
Jin et al.

(10) Patent No.: US 10,419,180 B2
(45) Date of Patent: Sep. 17, 2019

(54) DEMODULATION REFERENCE SIGNAL PORT INDICATION METHOD, DEVICE, AND BASE STATION

(71) Applicant: China Mobile Communications Corporation, Beijing (CN)

(72) Inventors: Jing Jin, Beijing (CN); Hui Tong, Beijing (CN); Qixing Wang, Beijing (CN); Fei Wang, Beijing (CN); Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 82 days.

(21) Appl. No.: 15/784,980

(22) Filed: Oct. 16, 2017

(65) Prior Publication Data
US 2018/0041320 A1    Feb. 8, 2018

Related U.S. Application Data

(63) Continuation of application No. PCT/CN2016/079248, filed on Apr. 14, 2016.

(30) Foreign Application Priority Data

Apr. 14, 2015  (CN) .......................... 2015 1 0173761

(51) Int. Cl.
*H04L 5/00* (2006.01)
*H04L 1/18* (2006.01)
(Continued)

(52) U.S. Cl.
CPC ............. *H04L 5/0048* (2013.01); *H04B 7/04* (2013.01); *H04B 7/0417* (2013.01); *H04L 1/18* (2013.01);
(Continued)

(58) Field of Classification Search
CPC ... H04L 5/0048; H04L 5/0026; H04L 5/0044; H04L 5/0064; H04L 1/18; H04B 7/04; H04B 7/0417; H04W 88/02; H04W 88/08
See application file for complete search history.

(56) References Cited

U.S. PATENT DOCUMENTS 8,718,662 B2    5/2014    Shan et al.
8,989,756 B2    3/2015    Shan et al.
(Continued)

FOREIGN PATENT DOCUMENTS

CN    101932096 A    12/2010
CN    102158302 A    8/2011

OTHER PUBLICATIONS

Supplementary European Search Report in European application No. 16779600.2, dated Jun. 6, 2018.
(Continued)

*Primary Examiner* — Habte Mered
(74) *Attorney, Agent, or Firm* — Mintz Levin Cohn Ferris Glovsky and Popeo, P.C.; Kongsik Kim; Jhongwoo Jay Peck

(57) ABSTRACT

A Demodulation Reference Signal (DMRS) port indication method, device and a base station are disclosed. A provided DMRS port indication table covers all cases of transmission maximally supporting 8 layers, and 4 bits defined by DMRS port indication information may indicate all the cases in the DMRS port indication table in combination with single-codeword transmission and double-codeword transmission cases of a related standard, so that bit overhead of the DMRS port indication information may be reduced.

13 Claims, 4 Drawing Sheets

(51) Int. Cl.
*H04W 72/04* (2009.01)
*H04B 7/04* (2017.01)
*H04B 7/0417* (2017.01)
*H04W 88/02* (2009.01)
*H04W 88/08* (2009.01)

(52) U.S. Cl.
CPC .......... *H04L 5/0026* (2013.01); *H04L 5/0091* (2013.01); *H04W 72/042* (2013.01); *H04L 5/0044* (2013.01); *H04L 5/0064* (2013.01); *H04W 88/02* (2013.01); *H04W 88/08* (2013.01)

(56) References Cited

U.S. PATENT DOCUMENTS

| | | |
|---|---|---|
| 2011/0194536 A1 | 8/2011 | Kim et al. |
| 2011/0237283 A1 | 9/2011 | Shan et al. |
| 2012/0134338 A1 | 5/2012 | Ko et al. |
| 2012/0213167 A1 | 8/2012 | Xu et al. |
| 2012/0300728 A1 | 11/2012 | Lee et al. |
| 2012/0300863 A1 | 11/2012 | Nogami et al. |
| 2013/0265951 A1 | 10/2013 | Ng et al. |
| 2014/0233466 A1* | 8/2014 | Pourahmadi ......... H04L 5/0051 370/329 |
| 2014/0241287 A1 | 8/2014 | Shan et al. |
| 2014/0334454 A1* | 11/2014 | Nogami ............... H04B 7/0452 370/335 |
| 2015/0156753 A1 | 6/2015 | Shan et al. |
| 2015/0188679 A1 | 7/2015 | Lee et al. |
| 2015/0382356 A1 | 12/2015 | Kim et al. |
| 2016/0036570 A1 | 2/2016 | Lee et al. |
| 2016/0081067 A1 | 3/2016 | Xu et al. |
| 2017/0005766 A1 | 1/2017 | Lee et al. |
| 2017/0094667 A1 | 3/2017 | Nogami et al. |
| 2017/0338929 A1 | 11/2017 | Lee et al. |
| 2018/0026684 A1* | 1/2018 | Wei ..................... H04B 7/0452 370/329 |
| 2018/0124794 A1 | 5/2018 | Nogami et al. |

OTHER PUBLICATIONS

International Search Report in international application No. PCT/CN2016/079248, dated Jun. 20, 2016.
English Translation of the Written Opinion of the International Search Authority in international application No. PCT/CN2016/079248, dated Jun. 20, 2016.
The Partial Supplementary European Search Report in European application No. 16779600.2, dated Feb. 23, 2018.

* cited by examiner

DEMODULATION REFERENCE SIGNAL PORT INDICATION METHOD, DEVICE, AND BASE STATION

CROSS-REFERENCE TO RELATED APPLICATIONS

The disclosure is a continuation application of International Application No. PCT/CN2016/079248 filed on Apr. 14, 2016, which claims priority to Chinese Patent Application No. 201510173761.1 filed on Apr. 14, 2015. The applications are hereby incorporated by reference.

TECHNICAL FIELD

The disclosure relates to the field of wireless communications, and particularly to a Demodulation Reference Signal (DMRS) port indication method, device, and a base station.

BACKGROUND

A communication system, such as Long Term Evolution (LTE), Worldwide Interoperability for Microwave Access (WiMax) and 802.11n, in a related technology adopts a conventional Two-Dimensional Multiple-Input Multiple-Output (2D MIMO) technology, and a basic principle of the conventional 2D MIMO technology is to improve transmission quality and increase a system capacity through degrees of freedom of a 2D space on a horizontal plane. Along with development of an antenna design architecture, for improving transmission efficiency of a mobile communication system and improving a user experience, it is necessary to fully excavate degrees of freedom of a vertical space, extend the conventional 2D MIMO technology to Three-Dimensional (3D) MIMO technology and fully utilize degrees of freedom of a 3D space to improve system performance.

FIG. 1 is a schematic diagram of a 3D MIMO antenna. From the figure, it can be seen that the 3D MIMO antenna extends original N antennae into N×M-dimensional antennae in a matrix form, herein there are N antennae in a horizontal direction, there are M antennae in a vertical direction, and each original horizontal antenna is formed by M (i.e. 8-10) antenna array elements in the vertical direction.

SUMMARY

The disclosure provides a DMRS port indication method, device and a base station, which solves the problem of high bit overhead of DMRS port indication information during transmission maximally supporting 8 layers.

According to an aspect of the disclosure, a DMRS port indication method is provided, which may include that:

a specified DMRS port is allocated to User Equipment (UE) according to a DMRS port indication table, herein all combinations of UE downlink transmission layer numbers and corresponding DMRS ports, in cases that a Physical Downlink Shared Channel (PDSCH) is punctured and is not punctured may be recorded in the DMRS port indication table; and DMRS port indication information is sent to the UE according to information of the DMRS port allocated to the UE, the DMRS port indication information including 4 bits, herein the 4 bits may include a first control bit indicating whether the PDSCH of the UE in the DMRS port indication table is punctured or not and other 3 second control bits indicating the UE downlink transmission layer numbers and corresponding DMRS ports in the DMRS port indication table.

Optionally, the DMRS port indication information may include the following indication states:

a first state in which the first control bit indicates that the PDSCH of the UE in the DMRS port indication table is not punctured in case of single-codeword transmission;

a second state in which the first control bit indicates that the PDSCH of the UE in the DMRS port indication table is not punctured in case of double-codeword transmission;

a third state in which the first control bit indicates that the PDSCH of the UE in the DMRS port indication table is punctured in case of single-codeword transmission;

a fourth state in which the first control bit indicates that the PDSCH of the UE in the DMRS port indication table is punctured in case of double-codeword transmission.

Optionally, the first state may include: a first sub-state in which the second control bits indicate, in the DMRS port indication table, combination information of single-layer transmission of the UE and each DMRS port, a second sub-state in which the second control bits indicate, in the DMRS port indication table, combination information of UE downlink retransmission layer numbers and each DMRS port, and a third sub-state in which the second control bits indicate that a reserved place is set in the DMRS port indication table;

the second state may include: a fourth sub-state in which the second control bits indicate, in the DMRS port indication table, combination information of 2-to-4-layer transmission of the UE and each DMRS port, and a fifth sub-state in which the second control bits indicate, in the DMRS port indication table, combination information of 5-to-8-layer transmission of the UE and each DMRS port;

the third state may include: a sixth sub-state in which the second control bits indicate, in the DMRS port indication table, combination information of single-layer transmission of the UE and each DMRS port; and the fourth state may include: a seventh sub-state in which the second control bits indicate, in the DMRS port indication table, combination information of 2-to-4-layer transmission of the UE and each DMRS port, herein the first sub-state and the fourth sub-state may both indicate that a total downlink transmission layer number is less than or equal to 4; and the fifth sub-state, the sixth sub-state and the seventh sub-state may indicate that the total downlink transmission layer number is more than or equal to 5.

Optionally, the step that the specified DMRS port is allocated to the UE according to the DMRS port indication table may include that:

when the UE only supports single-layer transmission and a current total downlink transmission layer number is less than or equal to 4, a DMRS port indicated to be a combination in the first sub-state is allocated to the UE according to the DMRS port indication table;

when the UE requires retransmission, a DMRS port indicated to be a combination in the second sub-state is allocated to the UE according to the DMRS port indication table;

when the UE supports 2-to-4-layer transmission and the current total downlink transmission layer number is less than or equal to 4, a DMRS port indicated to be a combination in the fourth sub-state is allocated to the UE according to the DMRS port indication table;

when there is only one piece of UE performing transmission, the UE supports 5-to-8-layer transmission and the current total downlink transmission layer number is more than or equal to 5, a DMRS port indicated to be a combination in the fifth sub-state is allocated to the UE according to the DMRS port indication table;

when the UE only supports single-layer transmission and the current total downlink transmission layer number is more than or equal to 5, a DMRS port indicated to be a combination in the sixth sub-state is allocated to the UE according to the DMRS port indication table;

when the UE supports 2-to-4-layer transmission and the current total downlink transmission layer number is less than or equal to 5, a DMRS port indicated to be a combination in the seventh sub-state is allocated to the UE according to the DMRS port indication table; and when a specific DMRS port is required to be allocated to the UE, the DMRS port indication information indicated to be in the third sub-state is sent to the UE according to the DMRS port indication table.

Optionally, that the PDSCH is not punctured may represent that a current UE downlink transmission layer number is less than or equal to 4 and the total downlink transmission layer number is less than or equal to 4, or the current UE downlink transmission layer number is more than 4; and that the PDSCH is punctured may represent that the current UE downlink transmission layer number is more than or equal to 4 and the total downlink transmission layer number is more than 4.

Optionally, when there exists multiple pieces of UE, the step that the specified DMRS port is allocated to the UE according to the DMRS port indication table may include that:

descending ordering is performed on the UEs to obtain a first ordering sequence according to a maximum downlink transmission layer number currently supported by the UEs; and a corresponding DMRS port is allocated to each piece of UE according to an order of the UE in the first ordering sequence and the DMRS port indication table.

Optionally, when there exists multiple pieces of UE, the step that the specified DMRS port is allocated to the UE according to the DMRS port indication table may include that:

ascending ordering is performed on the UEs to obtain a second ordering sequence according to a maximum downlink transmission layer number currently supported by the UEs; and a corresponding DMRS port is allocated to each piece of UE according to an order of the UE in the second ordering sequence and the DMRS port indication table.

According to another aspect of the disclosure, a DMRS port indication device is further provided, which may include:

an allocation module, configured to allocate a specified DMRS port to UE according to a DMRS port indication table, herein all combinations of UE downlink transmission layer numbers and corresponding DMRS ports, in cases that a PDSCH is punctured and is not punctured may be recorded in the DMRS port indication table; and a sending module, configured to send DMRS port indication information to the UE according to information of the DMRS port allocated to the UE, the DMRS port indication information including 4 bits, herein the 4 bits may include a first control bit indicating whether the PDSCH of the UE in the DMRS port indication table is punctured or not and other 3 second control bits indicating the UE downlink transmission layer numbers and corresponding DMRS ports in the DMRS port indication table.

Optionally, the DMRS port indication information may include the following indication states:

a first state in which the first control bit indicates that the PDSCH of the UE in the DMRS port indication table is not punctured in case of single-codeword transmission;

a second state in which the first control bit indicates that the PDSCH of the UE in the DMRS port indication table is not punctured in case of double-codeword transmission;

a third state in which the first control bit indicates that the PDSCH of the UE in the DMRS port indication table is punctured in case of single-codeword transmission;

a fourth state in which the first control bit indicates that the PDSCH of the UE in the DMRS port indication table is punctured in case of double-codeword transmission.

Optionally, the first state may include: a first sub-state in which the second control bits indicate, in the DMRS port indication table, combination information of single-layer transmission of the UE and each DMRS port, a second sub-state in which the second control bits indicate, in the DMRS port indication table, combination information of UE downlink retransmission layer numbers and each DMRS port, and a third sub-state in which the second control bits indicate that a reserved place is set in the DMRS port indication table;

the second state may include: a fourth sub-state in which the second control bits indicate, in the DMRS port indication table, combination information of 2-to-4-layer transmission of the UE and each DMRS port, and a fifth sub-state in which the second control bits indicate, in the DMRS port indication table, combination information of 5-to-8-layer transmission of the UE and each DMRS port;

the third state may include: a sixth sub-state in which the second control bits indicate, in the DMRS port indication table, combination information of single-layer transmission of the UE and each DMRS port; and the fourth state may include: a seventh sub-state in which the second control bits indicate, in the DMRS port indication table, combination information of 2-to-4-layer transmission of the UE and each DMRS port, herein, the first sub-state and the fourth sub-state may both indicate that a total downlink transmission layer number is less than or equal to 4; and the fifth sub-state, the sixth sub-state and the seventh sub-state may indicate that the total downlink transmission layer number is more than or equal to 5.

Optionally, the allocation module may include:

a first allocation unit, configured to, when the UE only supports single-layer transmission and a current total downlink transmission layer number is less than or equal to 4, allocate a DMRS port indicated to be a combination in the first sub-state to the UE according to the DMRS port indication table;

a second allocation unit, configured to, when the UE requires retransmission, allocate a DMRS port indicated to be a combination in the second sub-state to the UE according to the DMRS port indication table;

a third allocation unit, configured to, when the UE supports 2-to-4-layer transmission and the current total downlink transmission layer number is less than or equal to 4, allocate a DMRS port indicated to be a combination in the fourth sub-state to the UE according to the DMRS port indication table;

a fourth allocation unit, configured to, when there is only one piece of UE performing transmission, the UE supports 5-to-8-layer transmission and the current total downlink transmission layer number is more than or equal to 5, allocate a DMRS port indicated to be a combination in the fifth sub-state to the UE according to the DMRS port indication table;

a fifth allocation unit, configured to, when the UE only supports single-layer transmission and the current total downlink transmission layer number is more than or equal to 5, allocate a DMRS port indicated to be a combination in the sixth sub-state to the UE according to the DMRS port indication table;

a sixth allocation unit, configured to, when the UE supports 2-to-4-layer transmission and the current total downlink transmission layer number is less than or equal to 5, allocate a DMRS port indicated to be a combination in the seventh sub-state to the UE according to the DMRS port indication table; and a seventh allocation unit, configured to, when a specific DMRS port is required to be allocated to the UE, send DMRS port indication information indicated to be in the third sub-state to the UE according to the DMRS port indication table.

Optionally, the allocation module may include:

a first ordering unit, configured to, when there exists multiple pieces of UE, perform descending ordering on UEs to obtain a first ordering sequence according to a maximum downlink transmission layer number currently supported by the UEs; and an eighth allocation unit, configured to allocate a corresponding DMRS port to each piece of UE according to an order of the UE in the first ordering sequence and the DMRS port indication table.

Optionally, the allocation module may further include:

a second ordering unit, configured to, when there exists multiple pieces of UE, perform ascending ordering on the UEs to obtain a second ordering sequence according to a maximum downlink transmission layer number currently supported by the UEs; and a ninth allocation unit, configured to allocate a corresponding DMRS port to each piece of UE according to an order of the UE in the second ordering sequence and the DMRS port indication table.

According to another aspect of the disclosure, a base station is further provided, which may include the above-mentioned DMRS port indication device.

According to the DMRS port indication method, device and base station in embodiments of the disclosure, the provided DMRS port indication table covers all cases of transmission maximally supporting 8 layers, and the 4 bits defined by the DMRS port indication information may indicate all the cases in the DMRS port indication table in combination with single-codeword transmission and double-codeword transmission cases of a related standard, so that bit overhead of the DMRS port indication information may be reduced.

BRIEF DESCRIPTION OF DRAWINGS

FIG. 2 shows an occupation of DMRS resources when 4-layer transmission is supported in a related standard.

FIG. 3 shows an occupation of DMRS resources when maximally 8-layer transmission is supported in the related standard.

DETAILED DESCRIPTION

Figure 1:
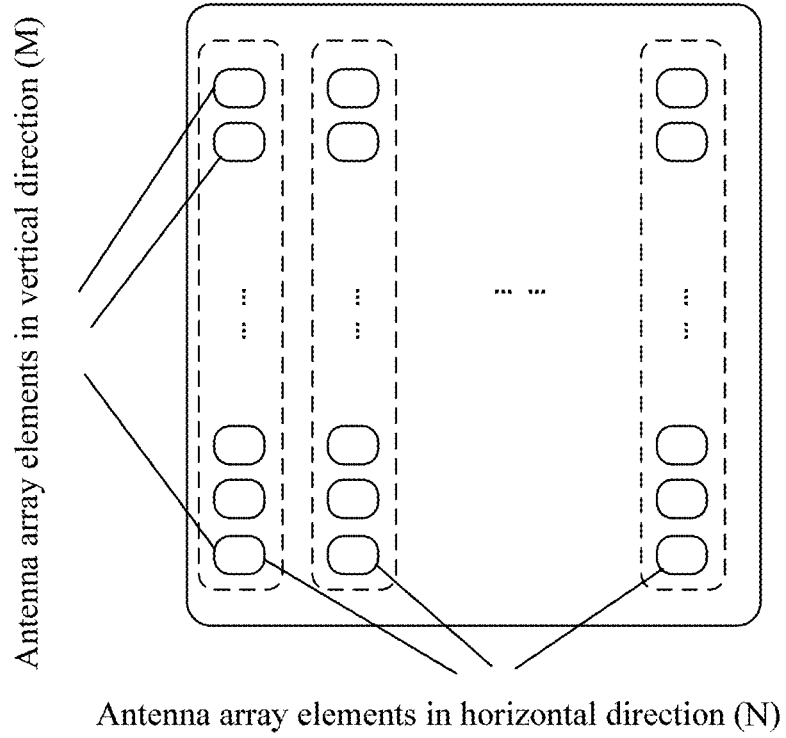
FIG. 1 shows a schematic diagram of a 3D MIMO antenna according to the related technology.

Compared with conventional 2D MIMO, 3D MIMO may distinguish more paired users. However, in a related standard, a Multi-User MIMO (MU MIMO) DMRS maximally supports 4 layers, and cannot meet a requirement of a 3D MIMO technology.

Figure 2:
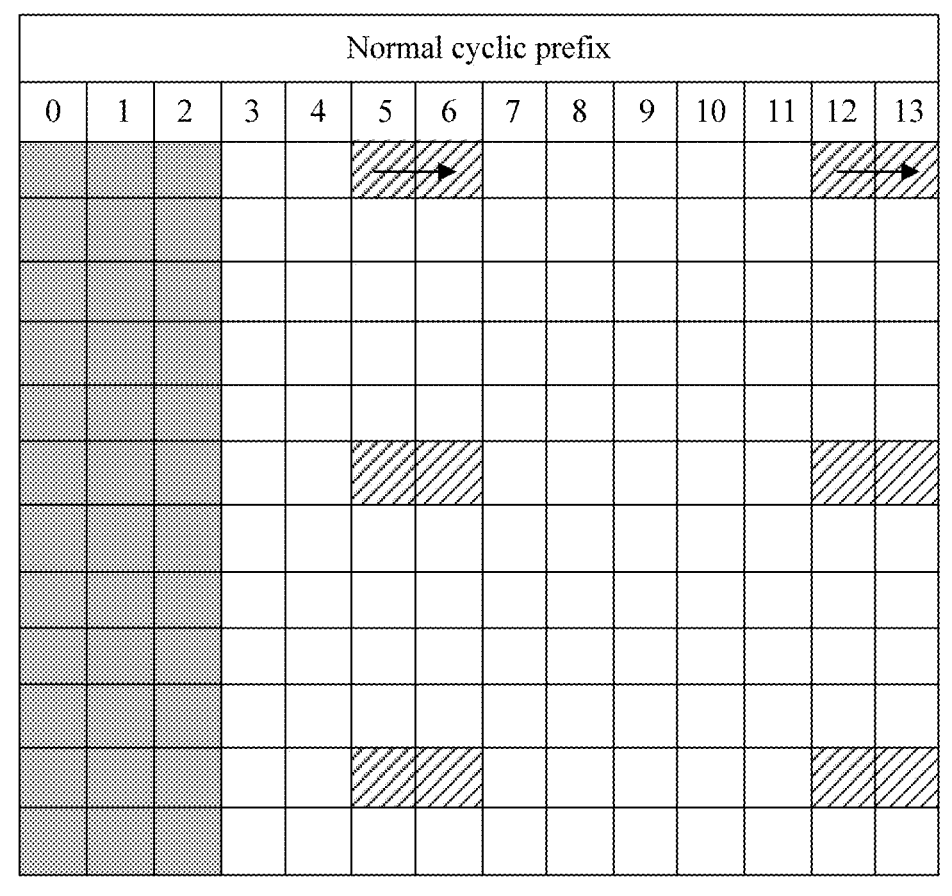

Under a 3rd Generation Partnership Project Release 12 (3GPP R12), as shown in Table 1 and FIG. 2, herein Table 1 is a support of a DMRS when MU MIMO supports 4-layer transmission in the related technology, and FIG. 2 shows an occupation of DMRS resources when 4-layer transmission is supported in the related standard. From Table 1, it can be seen that totally 4-layer transmission (layers 1-4) is provided by utilizing an Orthogonal Cover Code (OCC) with a length of 2 and two quasi-orthogonal scrambling Identifiers (IDs) 0 and 1 through two orthogonal DMRS ports Port7 and Port8.

TABLE 1

| | | | Scrambling (quasi-orthogonal) | |
|---|---|---|---|---|
| | | | ID = 0 | ID = 1 |
| OCC | Port7 | [+1+1] | Layer1 | Layer3 |
| | Port8 | [+1−1] | Layer2 | Layer4 |

During application of DMRSs in the related technology, when there exists 2 users (UE1 and UE2) and each user performs single-layer transmission, a solution 1 may be adopted: the UE1 uses Port7; and the UE2 uses Port8.

When there exists 2 users (UE1 and UE2) and each user performs double-layer transmission, a solution 2 may be adopted: the UE1 uses Port7 and Port8, and uses the scrambling ID 0; and the UE2 uses Port7 and Port8, and uses the scrambling ID 1.

When there exists 4 users (UE1, UE2, UE3 and UE4) and each user performs single-layer transmission, a solution 3 may be adopted: the UE1 uses Port7, and uses the scrambling ID 0; the UE2 uses Port7, and uses the scrambling ID 1; the UE3 uses Port8, and uses the scrambling ID 0; and the UE4 uses Port8, and uses the scrambling ID 1.

From the above, it can be seen that the DMRS solutions in the related technology maximally support 4-layer transmission.

In combination with standardization development, one of DMRS pattern trends currently in standardization discussion is that: a DMRS of new UE uses totally 24 Resource Elements (REs), and 8 orthogonal DMRS ports are provided by virtue of an OCC=4 with a length of 4.

Figure 3:
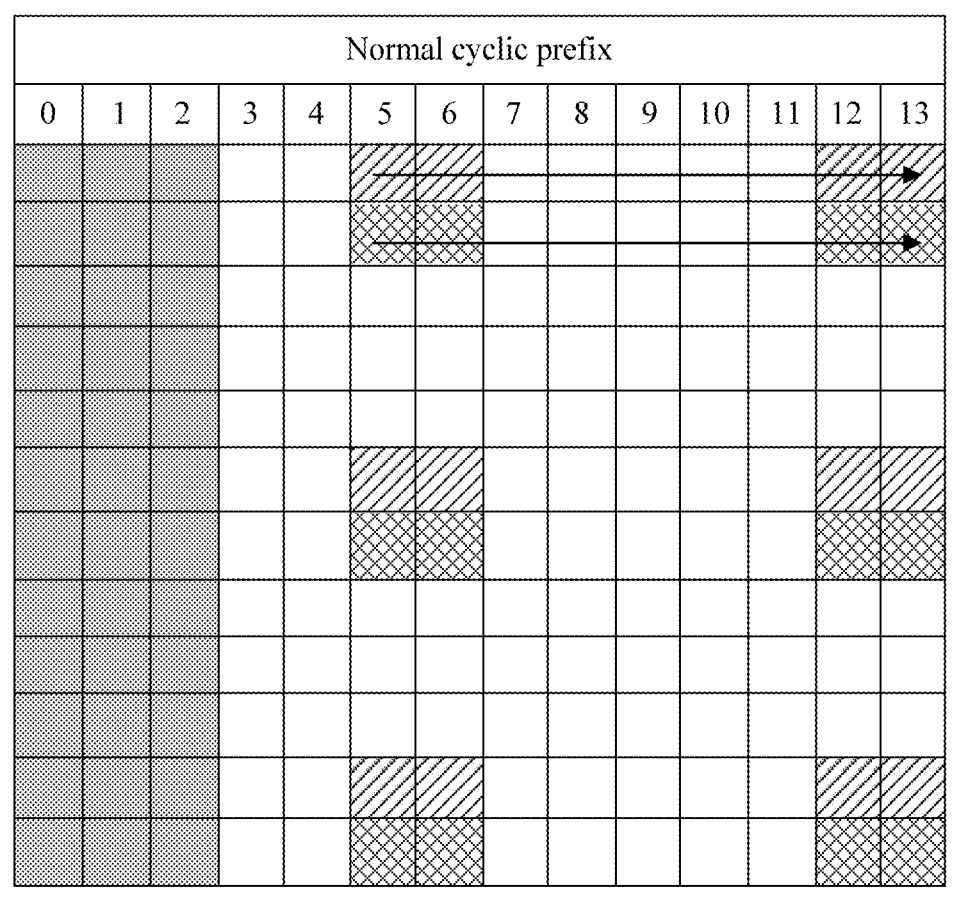

As shown in Table 2 and FIG. 3, Table 2 is a case of a DMRS when MU MIMO supports maximally 8-layer transmission, and FIG. 3 shows a corresponding occupation of DMRS resources when maximally 8-layer transmission is supported, herein Port7~Port10 occupy the first 12 REs, and Port11~Port14 occupy the latter 12 REs. Different from a design of SingleUser (SU) maximally 8-layer transmission in the related technology: when SU MIMO supports 3-layer transmission in the related technology, an OCC with a length of 2 is used, and 24 REs are occupied. When new UE supports 3-layer transmission, an OCC with a length of 4 is used, and 12 REs are occupied.

TABLE 2

| Frequency Division Multiplexing (FDM) | OCC | Port7 | [+1+1+1+1] | Layer1 |
|---|---|---|---|---|
| | | Port8 | [+1−1+1−1] | Layer2 |
| | | Port9 | [+1+1−1−1] | Layer3 |
| | | Port10 | [+1−1−1+1] | Layer4 |
| | OCC | Port11 | [+1+1+1+1] | Layer5 |
| | | Port12 | [+1−1+1−1] | Layer6 |
| | | Port13 | [−1−1+1+1] | Layer7 |
| | | Port14 | [−1+1+1−1] | Layer8 |

Considering that there may exist the case that MU-MIMO totally occupies 24 REs and an SU occupies only 12 REs, the user is required to perform rate matching for puncture of the other 12 REs, that is, for the current user, no data is sent at positions of the other 12 REs, and UE knows that the positions are null when receiving data.

Then, Downlink Control Information (DCI) indicates a specific transmission layer of the user, and simultaneously, requires to indicate information about a total transmission layer number (whether more than 4 or not). A direct solution is that all cases of MU/SU transmission maximally supporting 8 layers are listed. Then, 4 bits are required to indicate that the current user uses ith-jth layers, and another bit is also required to indicate whether the total layer number is more than 4 or not. Table 3 is a DMRS port indication table in the direct solution.

TABLE 3

| DMRS port indication | | | |
|---|---|---|---|
| 1 codeword | | 2 codewords | |
| Value | Message | Value | Message |
| 0 | 1Layer, Port7 | 0 | 2Layers, Ports7~8 |
| 1 | 1Layer, Port8 | 1 | 2Layers, Ports9~10 |
| 2 | 1Layer, Port9 | 2 | 2Layers, Ports11~12 |
| 3 | 1Layer, Port10 | 3 | 2Layers, Ports13~14 |
| 4 | 1Layer, Port11 | 4 | 3Layers, Ports7~9 |
| 5 | 1Layer, Port12 | 5 | 3Layers, Ports11~13 |
| 6 | 1Layer, Port13 | 6 | 4Layers, Ports7~10 |
| 7 | 1Layer, Port14 | 7 | 4Layers, Ports11~14 |
| 8 | 2Layers, Ports7~8 | 8 | 5Layers, Ports7~11 |
| 9 | 3Layers, Ports 7~9 | 9 | 6Layers, Ports7~12 |
| 10 | 4Layers, Ports 7~10 | 10 | 7Layers, Ports7~13 |
| 11 | Reserved | 11 | 8Layers, Ports7~14 |
| 12~15 | Reserved | 12~15 | Reserved |

Exemplary embodiments of the disclosure will be described below in more detail with reference to the drawings. Although the exemplary embodiments of the disclosure are shown in the drawings, it should be understood that the disclosure may be implemented in various forms, and should not be limited by the embodiments elaborated herein. On the contrary, these embodiments are provided to make the disclosure understood more thoroughly and completely present the scope of the disclosure to those skilled in the art.

In a current DMRS technical solution maximally supporting 8 layers, considering that there may exist the case that MU-MIMO totally occupies 24 REs and an SU occupies only 12 REs, the user is required to perform rate matching for puncture of the other 12 REs, that is, for the current user, no data is sent at positions of the other 12 REs, and UE knows that the positions are null when receiving data. Then, DMRS port indication information may be included in a DCI message, requires to indicate a specific layer of the user, and simultaneously, indicate information about a total layer number (whether more than 4 or not). A direct solution in the related technology is that all cases of MU/SU transmission maximally supporting 8 layers are listed as a DMRS port indication table, as shown in Table 3, 16 value indications are defined in case of single-codeword transmission or double-codeword transmission, then 4 bits are required to be reserved in the DCI message to indicate that the current user uses ith-jth ports, and another bit is also required to be reserved to indicate whether a current total downlink transmission layer number is more than 4 or not.

Figure 4:
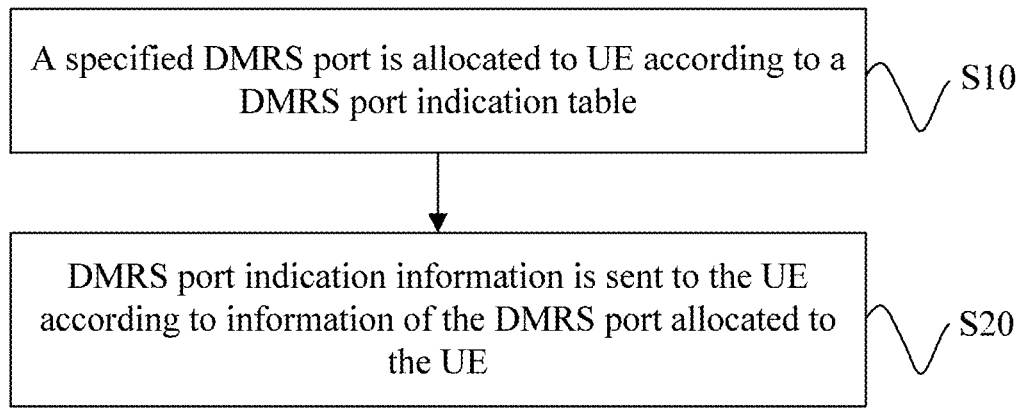
FIG. 4 shows a flowchart of a DMRS port indication method according to the disclosure.

In such a manner, the DMRS port indication may be implemented by 4 bit+1 bit in DCI message, and is 2 bits more than a 3 bit table defined in the related standard, and the DCI message is required to be sent by each downlink subframe, which causes very high channel overhead. In order to solve the problem, some embodiments of the disclosure provide a DMRS port indication method, which, as shown in FIG. 4, specifically includes the following Steps 10 and 20.

In Step 10: a specified DMRS port is allocated to UE according to a DMRS port indication table.

Here, all combinations of UE downlink transmission layer numbers and corresponding DMRS ports in cases that a PDSCH is punctured and is not punctured are recorded in the DMRS port indication table.

Herein, the DMRS port indication table mentioned here is different from that of the related technology, and may specifically be shown in Table 4. It is important to point out that a corresponding relationship between the UE downlink transmission layer numbers and the corresponding DMRS ports in Table 4 is determined according to port definitions in Table 2. When the definitions in Table 2 change, Table 4 will also correspondingly change. The DMRS port indication table covers all the cases in the direct solution, but the DMRS port indication table classifies combinations of the downlink transmission layer numbers and the DMRS ports according to different cases of whether the PDSCH is punctured or not and single-codeword transmission or double-codeword transmission, and 8 different values are defined in cases of the PDSCH unpunctured and single-codeword transmission, the PDSCH unpunctured and double-codeword transmission, the PDSCH punched and single-codeword transmission, and the PDSCH punched and double-codeword transmission.

TABLE 4

| | PDSCH unpunched, bit 0 (or 1) | | PDSCH punched, bit 1 (or 0) | |
|---|---|---|---|---|
| | 1 codeword | 2 codewords | 1 codeword | 2 codewords |
| 0 | 1 layer, port 7 | 0 2 layers, ports7-8 | 0 1 layer, port 7 | 0 2 layers, ports7-8 |
| 1 | 1 layer, port 8 | 1 2 layers, ports9-10 | 1 1 layer, port 8 | 1 2 layers, ports9-10 |
| 2 | 1 layer, port 9 | 2 3 layers, ports7-9 | 2 1 layer, port 9 | 2 2 layers, ports11-12 |
| 3 | 1 layer, port 10 | 3 4 layers, ports7-10 | 3 1 layer, port 10 | 3 2 layers, ports13-14 |
| 4 | 2 layers, ports7-8 | 4 5 layers, ports7-11 | 4 1 layer, port 11 | 4 3 layers, ports7-9 |
| 5 | 3 layers, ports7-9 | 5 6 layers, ports7-12 | 5 1 layer, port 12 | 5 3 layers, ports11-13 |
| 6 | 4 layers, ports7-10 | 6 7 layers, ports7-13 | 6 1 layer, port 13 | 6 4 layers, ports7-10 |
| 7 | Reserved | 7 8 layers, ports7-14 | 7 1 layer, port 14 | 7 4 layers, ports11-14 |

In Step 20: DMRS port indication information is sent to the UE according to information of the DMRS port allocated to the UE.

Here, the DMRS port indication information is included in a DCI message, and the DMRS port indication information includes 4 bits, specifically, the 4 bits include a first control bit indicating whether the PDSCH of the UE in the DMRS port indication table is punctured or not and other 3 second control bits indicating the UE downlink transmission layer numbers and corresponding DMRS ports in the DMRS port indication table.

Since there is an indication message indicating single-codeword transmission or double-codeword transmission in a standard of the related technology, it is only necessary to define the first control bit (0 or 1) indicating whether the PDSCH of the UE in the DMRS port indication table is punctured or not and the three second control bits indicating the UE downlink transmission layer numbers and corresponding DMRS ports in the DMRS port indication table. Compared with a manner of reserving 4 bit+1 bit in the DCI message in the direct solution, such a manner saves 1 bit, and is very significant for channel overhead of the DCI message.

Specifically, the DMRS port indication information includes four indication states. There is made such a hypothesis that the first control bit indicates that the PDSCH is not punctured when a value of the first control bit is 0 and the first control bit indicates that the PDSCH is punctured when the value of the first control bit is 1, herein that the PDSCH is not punctured refers to that a current user downlink transmission layer number is less than or equal to 4 and a total downlink transmission layer number is less than or equal to 4, or the current user downlink transmission layer number is more than 4; and that the PDSCH is punctured refers to that the current user downlink transmission layer number is more than or equal to 4 and the total downlink transmission layer number is more than 4. The four indication states are respectively:

a first state: the value of the first control bit is 0 in case of single-codeword transmission;

a second state: the value of the first control bit is 0 in case of double-codeword transmission;

a third state: the value of the first control bit is 1 in case of single-codeword transmission; and a fourth state: the value of the first control bit is 1 in case of double-codeword transmission.

Herein, there exists 8 different combination manners of the UE downlink transmission layer numbers and the corresponding DMRS ports, i.e. 8 values, in all of the above four states. The 3 second control bits may indicate all cases enumerated in the DMRS port indication table in combination with the first control bit. It is important to point out that value definitions, enumerated below, of the second control bits are only adopted for exemplary description and not intended to represent unique value definitions of the DMRS indication information. Specifically, the value of the first control bit in the first state is 0, and the first state includes:

a first sub-state in which the second control bits indicate, in the DMRS port indication table, combination information of single-layer transmission of the UE and each DMRS port, herein 4 different DMRS ports (such as port 7, port 8, port 9 and port 10 in Table 4) are provided for single-layer transmission of the UE in the DMRS port indication table, and a value of the second control bits may correspondingly be defined to be 000, 001, 010 and 011 to indicate the 4 different ports;

a second sub-state in which the second control bits indicate, in the DMRS port indication table, combination information of UE downlink retransmission layer numbers and each DMRS port, herein, as shown in Table 4, 3 different definitions are provided for UE retransmission in the DMRS port indication table, the corresponding DMRS ports are 7-8 in case of double-layer transmission, the corresponding DMRS ports are 7-9 in case of three-layer transmission, the corresponding DMRS ports are 7-10 in case of four-layer transmission, and the value of the second control bits is correspondingly defined to be 100, 101 and 110 respectively; and a third sub-state in which the second control bits indicate that a reserved place is set in the DMRS port indication table, the value of the second control bits being defined to be 111.

The value of the first control bit in the second state is 0, and the second state includes:

a fourth sub-state in which the second control bits indicate, in the DMRS port indication table, combination information of 2-to-4-layer transmission of the UE and each DMRS port, herein two different ports are provided for double-layer transmission of the UE in the DMRS port indication table, as shown in Table 4, ports 7-8 and ports 9-10, the value of the second control bits may be correspondingly defined to be 000 and 001 respectively, the DMRS port indication table provides ports 7-9 and ports 7-10 for three-layer transmission and four-layer transmission of the UE respectively, and the value of the second control bits may be correspondingly defined to be 010 and 011; and a fifth sub-state in which the second control bits indicate, in the DMRS port indication table, combination information of 5-to-8-layer transmission of the UE and each DMRS port, herein the DMRS port indication table provides ports 7-11, ports 7-12, ports 7-13 and ports 7-14 for 5-to 8-layer transmission of the UE respectively, and the value of the second control bits may be correspondingly defined to be 100, 101, 110 and 111.

The value of the first control bit in the third state is 1, and the third state includes: a sixth sub-state in which the second control bits indicate, in the DMRS port indication table, combination information of single-layer transmission of the UE and each DMRS port, herein 8 different DMRS ports, corresponding to port 7 to port 14 one to one respectively, are provided for single-layer transmission of the UE in the DMRS port indication table, and the value of the second control bits is correspondingly 000 to 111.

The fourth state includes: a seventh sub-state in which the second control bits indicate, in the DMRS port indication table, combination information of 2-to-4-layer transmission of the UE and each DMRS port, herein the DMRS port indication table provides 4 different DMRS port combinations for double-layer transmission of the UE, i.e. ports 7-8, ports 9-10, ports 11-12 and ports 13-14 respectively, the value of the second control bits is correspondingly 000, 001, 010 and 011, the DMRS port indication table provides 2 different DMRS port combinations for three-layer and four-layer transmission of the UE respectively, i.e. ports 7-9 and ports 11-13, ports 7-10 and ports 11-14 respectively, and the value of the second control bits is correspondingly 100, 101, 110 and 111. When the values of the first control bit and the second control bits are all the same, the first state, the second state, the third state and the fourth state are defined in case of single-codeword transmission and a multi-codeword transmission respectively, and there has been an indication manner for single-codeword transmission or double-codeword transmission in the standard of the related technology, so that the DMRS port may be accurately indicated by the first control bit and the second control bits.

Herein, the first sub-state and the fourth sub-state both indicate that a total downlink transmission layer number is less than or equal to 4; and the fifth sub-state, the sixth sub-state and the seventh sub-state indicate that the total downlink transmission layer number is more than or equal to 5. It is important to point out that the definitions of this part are consistent with the definition about whether the PDSCH is punctured or not, that is, first control information may indirectly reflect the current total downlink transmission layer number.

Furthermore, the step that the specified DMRS port is allocated to the UE according to the DMRS port indication table includes that:

when the UE only supports single-layer transmission and a current total downlink transmission layer number is less than or equal to 4, a DMRS port indicated to be a combination in the first sub-state is allocated to the UE according to the DMRS port indication table, herein a single-codeword transmission manner is adopted for single-layer transmission, and in such a case, the value of the first control bit in the DMRS port indication information is 0, and the value of the second control bits is any one of 000-100;

when the UE requires retransmission, a DMRS port indicated to be a combination in the second sub-state is allocated to the UE according to the DMRS port indication table, since retransmission is caused by a data transmission failure, and thus may be switched into single-codeword transmission, and in such a case, the value of the first control bit in the DMRS port indication information is 0, and the value of the second control bits is one of 101-110;

when the UE supports 2-to-4-layer transmission and the current total downlink transmission layer number is less than or equal to 4, a DMRS port indicated to be a combination in the fourth sub-state is allocated to the UE according to the DMRS port indication table, herein a double-codeword transmission manner is adopted for multilayer transmission, and in such a case, the value of the first control bit in the DMRS port indication information is 0, and the value of the second control bits is any one of 000-100;

when there is only one piece of UE performing transmission, the UE supports 5-to-8-layer transmission and the current total downlink transmission layer number is more than or equal to 5, a DMRS port indicated to be a combination in the fifth sub-state is allocated to the UE according to the DMRS port indication table, for example, five-layer transmission of the UE corresponds to ports 7-11, and in such a case, the value of the first control bit in the DMRS port indication information is 0, and the value of the second control bits is one of 101-111;

when the UE only supports single-layer transmission, single-codeword transmission is performed and the current total downlink transmission layer number is more than or equal to 5, a DMRS port indicated to be a combination in the sixth sub-state is allocated to the UE according to the DMRS port indication table, in such a case, the value of the first control bit in the DMRS port indication information is 1, and the value of the second control bits is any one of 000-111;

when the UE supports 2-to-4-layer transmission, double-codeword transmission is performed and the current total downlink transmission layer number is less than or equal to 5, a DMRS port indicated to be a combination in the seventh sub-state is allocated to the UE according to the DMRS port indication table, for example, when the UE performs three-layer transmission, ports 7-9 or ports 11-13 are allocated to the UE, and in such a case, the value of the first control bit in the DMRS port indication information is 1, and the value of the second control bits may be correspondingly selected to be one of 000-111 according to different transmission layers; and when a specific DMRS port is required to be allocated to the UE, the DMRS port indication information indicated to be in the third sub-state is sent to the UE according to the DMRS port indication table, that is, the value of the first control bit is 0, and the value of the second control bits is 111.

From the above, the DMRS port indication table (Table 4) provided by the embodiments of the disclosure covers all the cases of transmission maximally supporting 8 layers, the 4 bits defined by the DMRS port indication information may indicate all the cases in the DMRS port indication table in combination with single-codeword transmission and double-codeword transmission cases of a related standard, and certain 4 bits in the DCI message may usually be determined as the DMRS port indication information, so that bit overhead of the DMRS port indication information is reduced.

Furthermore, when there exists multiple pieces of UE with a DMRS port allocation requirement, the step that the specified DMRS port is allocated to the UE according to the DMRS port indication table includes that: descending ordering is performed on the UEs to obtain a first ordering sequence according to a maximum downlink transmission layer number currently supported by the UEs; and a corresponding DMRS port is allocated to each piece of UE according to an order of the UE in the first ordering sequence and the DMRS port indication table. For example, when there are 3 users A, B and C and maximum layer numbers supported by each user are 3, 2 and 1 respectively, a priority sequence of the 3 users is A, B and C, and when DMRS ports are allocated to them, ports, such as ports 7-9, are preferably allocated to A, then DMRS ports 11-12 without interference to A are allocated to B, and port 10 is finally allocated to C.

Furthermore, the UEs may also be ordered in an ascending manner, besides a descending manner, and a specific ordering method is similar to the descending manner, and thus will not be elaborated.

How to allocate the DMRS port to the UE in the embodiments of the disclosure is described above from a base station side, and a specific device for implementing the method will be further provided below.

Figure 5:
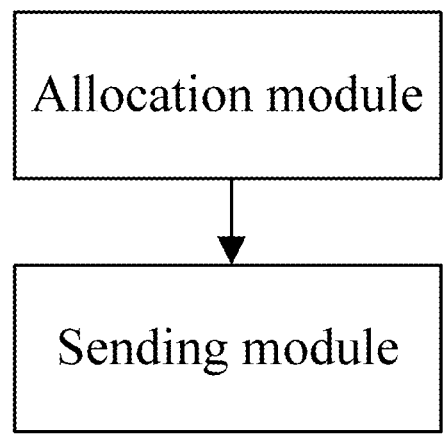
FIG. 5 shows a module diagram of a DMRS port indication device according to the disclosure.

As shown in FIG. 5, according to another aspect of the disclosure, a DMRS port indication device is further provided, which includes:

an allocation module, configured to allocate a specified DMRS port to UE according to a DMRS port indication table, herein all combinations of UE downlink transmission layer numbers and corresponding DMRS ports in cases that a PDSCH is punctured and is not punctured are recorded in the DMRS port indication table; and a sending module, configured to send DMRS port indication information to the UE according to information of the DMRS port allocated to the UE, the DMRS port indication information including 4 bits, herein the 4 bits include a first control bit indicating whether the PDSCH of the UE in the DMRS port indication table is punctured or not and other 3 second control bits indicating the UE downlink transmission layer numbers and corresponding DMRS ports in the DMRS port indication table.

Herein, the DMRS port indication information includes the following indication states:

a first state in which the first control bit indicates that the PDSCH of the UE in the DMRS port indication table is not punctured in case of single-codeword transmission;

a second state in which the first control bit indicates that the PDSCH of the UE in the DMRS port indication table is not punctured in case of double-codeword transmission;

a third state in which the first control bit indicates that the PDSCH of the UE in the DMRS port indication table is punctured in case of single-codeword transmission;

a fourth state in which the first control bit indicates that the PDSCH of the UE in the DMRS port indication table is punctured in case of double-codeword transmission.

Specifically, the first state includes: a first sub-state in which the second control bits indicate, in the DMRS port indication table, combination information of single-layer transmission of the UE and each DMRS port, a second sub-state in which the second control bits indicate, in the DMRS port indication table, combination information of UE downlink retransmission layer numbers and each DMRS port, and a third sub-state in which the second control bits indicate that a reserved place is set in the DMRS port indication table;

the second state may include: a fourth sub-state in which the second control bits indicate, in the DMRS port indication table, combination information of 2-to-4-layer transmission of the UE and each DMRS port, and a fifth sub-state in which the second control bits indicate, in the DMRS port indication table, combination information of 5-to-8-layer transmission of the UE and each DMRS port;

the third state may include: a sixth sub-state in which the second control bits indicate, in the DMRS port indication table, combination information of single-layer transmission of the UE and each DMRS port; and the fourth state may include: a seventh sub-state in which the second control bits indicate, in the DMRS port indication table, combination information of 2-to-4-layer transmission of the UE and each DMRS port, herein, the first sub-state and the fourth sub-state may both indicate that a total downlink transmission layer number is less than or equal to 4; and the fifth sub-state, the sixth sub-state and the seventh sub-state may indicate that the total downlink transmission layer number is more than or equal to 5.

Specifically, the allocation module includes:

a first allocation unit, configured to, when the UE only supports single-layer transmission and a current total downlink transmission layer number is less than or equal to 4, allocate a DMRS port indicated to be a combination in the first sub-state to the UE according to the DMRS port indication table;

a second allocation unit, configured to, when the UE requires retransmission, allocate a DMRS port indicated to be a combination in the second sub-state to the UE according to the DMRS port indication table;

a third allocation unit, configured to, when the UE supports 2-to-4-layer transmission and the current total downlink transmission layer number is less than or equal to 4, allocate a DMRS port indicated to be a combination in the fourth sub-state to the UE according to the DMRS port indication table;

a fourth allocation unit, configured to, when there is only one piece of UE performing transmission, the UE supports 5-to-8-layer transmission and the current total downlink transmission layer number is more than or equal to 5, allocate a DMRS port indicated to be a combination in the fifth sub-state to the UE according to the DMRS port indication table;

a fifth allocation unit, configured to, when the UE only supports single-layer transmission and the current total downlink transmission layer number is more than or equal to 5, allocate a DMRS port indicated to be a combination in the sixth sub-state to the UE according to the DMRS port indication table;

a sixth allocation unit, configured to, when the UE supports 2-to-4-layer transmission and the current total downlink transmission layer number is less than or equal to 5, allocate a DMRS port indicated to be a combination in the seventh sub-state to the UE according to the DMRS port indication table; and a seventh allocation unit, configured to, when a specific DMRS port is required to be allocated to the UE, send the DMRS port indication information indicated to be in the third sub-state to the UE according to the DMRS port indication table.

Specifically, the allocation module includes:

a first ordering unit, configured to, when there exists multiple pieces of UE, perform descending ordering on UEs to obtain a first ordering sequence according to a maximum downlink transmission layer number currently supported by the UEs; and an eighth allocation unit, configured to allocate a corresponding DMRS port to each piece of UE according to an order of the UE in the first ordering sequence and the DMRS port indication table.

the allocation module further includes:

a second ordering unit, configured to, when there exists multiple pieces of UE, perform ascending ordering on the UEs to obtain a second ordering sequence according to a maximum downlink transmission layer number currently supported by the UEs; and a ninth allocation unit, configured to allocate a corresponding DMRS port to each piece of UE according to an order of the UE in the second ordering sequence and the DMRS port indication table.

It is important to note that the device is a device corresponding to the abovementioned DMRS port indication method, all implementation modes in the abovementioned method embodiment are applied to the device embodiment, and the same technical effect may also be achieved.

According to another aspect of the disclosure, a base station is further provided, which includes the abovementioned DMRS port indication device.

Those skilled in the art should know that the embodiment of the disclosure may be provided as a method, a system or a computer program product. Therefore, forms of pure hardware embodiments, pure software embodiments or embodiments integrating software and hardware may be adopted in the disclosure. Moreover, a form of the computer program product implemented on one or more computer-available storage media (including, but not limited to, a disk memory, a Compact Disc Read-Only Memory (CD-ROM), an optical memory and the like) including computer-available program codes may be adopted in the disclosure.

The disclosure is described with reference to flowcharts and/or block diagrams of the method, device (system) and the computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a manufactured product including an instruction device may be generated by the instructions stored in the computer-readable memory, the instruction device realizes the function specified in one flow or more flows in the flowcharts and/or one block or more blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is the preferred implementation mode of the disclosure. It should be point out that those skilled in the art may further make a plurality of improvements and embellishments without departing from the principle of the disclosure, and these improvements and embellishments also fall within the scope of protection of the disclosure.

The invention claimed is:

1. A Demodulation Reference Signal (DMRS) port indication method, comprising:
   allocating a specified DMRS port to User Equipment (UE) according to a DMRS port indication table, wherein all combinations of UE downlink transmission layer numbers and corresponding DMRS ports, in cases that a Physical Downlink Shared Channel (PDSCH) is punctured and is not punctured, are recorded in the DMRS port indication table; and
   sending DMRS port indication information to the UE according to information of the DMRS port allocated to the UE, the DMRS port indication information comprising 4 bits, wherein the 4 bits comprises a first control bit indicating whether the PDSCH of the UE in the DMRS port indication table is punctured or not and other 3 second control bits indicating the UE downlink transmission layer numbers and corresponding DMRS ports in the DMRS port indication table.

2. The DMRS port indication method according to claim 1, wherein the DMRS port indication information comprises the following indication states:
   a first state in which the first control bit indicates that the PDSCH of the UE in the DMRS port indication table is not punctured in case of single-codeword transmission;
   a second state in which the first control bit indicates that the PDSCH of the UE in the DMRS port indication table is not punctured in case of double-codeword transmission;
   a third state in which the first control bit indicates that the PDSCH of the UE in the DMRS port indication table is punctured in case of single-codeword transmission;
   a fourth state in which the first control bit indicates that the PDSCH of the UE in the DMRS port indication table is punctured in case of double-codeword transmission.

3. The DMRS port indication method according to claim 2, wherein the first state comprises: a first sub-state in which the second control bits indicate, in the DMRS port indication table, combination information of single-layer transmission of the UE and each DMRS port, a second sub-state in which the second control bits indicate, in the DMRS port indication table, combination information of UE downlink retransmission layer numbers and each DMRS port, and a third sub-state in which the second control bits indicate that a reserved place is set in the DMRS port indication table;

the second state comprises: a fourth sub-state in which the second control bits indicate, in the DMRS port indication table, combination information of 2-to-4-layer transmission of the UE and each DMRS port, and a fifth sub-state in which the second control bits indicate, in the DMRS port indication table, combination information of 5-to-8-layer transmission of the UE and each DMRS port;

the third state comprises: a sixth sub-state in which the second control bits indicate, in the DMRS port indication table, combination information of single-layer transmission of the UE and each DMRS port; and the fourth state comprises: a seventh sub-state in which the second control bits indicate, in the DMRS port indication table, combination information of 2-to-4-layer transmission of the UE and each DMRS port, wherein the first sub-state and the fourth sub-state both indicate that a total downlink transmission layer number is less than or equal to 4; and the fifth sub-state, the sixth sub-state and the seventh sub-state indicate that the total downlink transmission layer number is more than or equal to 5.

4. The DMRS port indication method according to claim 3, wherein the step of allocating the specified DMRS port to the UE according to the DMRS port indication table comprises:
   when the UE only supports single-layer transmission and a current total downlink transmission layer number is less than or equal to 4, allocating a DMRS port indicated to be a combination in the first sub-state to the UE according to the DMRS port indication table;
   when the UE requires retransmission, allocating a DMRS port indicated to be a combination in the second sub-state to the UE according to the DMRS port indication table;
   when the UE supports 2-to-4-layer transmission and the current total downlink transmission layer number is less than or equal to 4, allocating a DMRS port indicated to be a combination in the fourth sub-state to the UE according to the DMRS port indication table;
   when there is only one piece of UE performing transmission, the UE supports 5-to-8-layer transmission and the current total downlink transmission layer number is more than or equal to 5, allocating a DMRS port indicated to be a combination in the fifth sub-state to the UE according to the DMRS port indication table;
   when the UE only supports single-layer transmission and the current total downlink transmission layer number is more than or equal to 5, allocating a DMRS port indicated to be a combination in the sixth sub-state to the UE according to the DMRS port indication table;
   when the UE supports 2-to-4-layer transmission and the current total downlink transmission layer number is less than or equal to 5, allocating a DMRS port indicated to be a combination in the seventh sub-state to the UE according to the DMRS port indication table; and when a specific DMRS port is required to be allocated to the UE, sending the DMRS port indication information indicated to be in the third sub-state to the UE according to the DMRS port indication table.

5. The DMRS port indication method according to claim 1, wherein that the PDSCH is not punctured represents that a current UE downlink transmission layer number is less than or equal to 4 and the total downlink transmission layer number is less than or equal to 4, or the current UE downlink transmission layer number is more than 4; and that the PDSCH is punctured represents that the current UE downlink transmission layer number is more than or equal to 4 and the total downlink transmission layer number is more than 4.

6. The DMRS port indication method according to claim 1, wherein, when there exists multiple pieces of UE, the step of allocating the specified DMRS port to the UE according to the DMRS port indication table comprises:

performing descending ordering on the UEs to obtain a first ordering sequence according to a maximum downlink transmission layer number currently supported by the UEs; and allocating a corresponding DMRS port to each piece of UE according to an order of the UE in the first ordering sequence and the DMRS port indication table.

7. The DMRS port indication method according to claim 1, wherein, when there exists multiple pieces of UE, the step of allocating the specified DMRS port to the UE according to the DMRS port indication table comprises:

performing ascending ordering on the UEs to obtain a second ordering sequence according to a maximum downlink transmission layer number currently supported by the UEs; and allocating a corresponding DMRS port to each piece of UE according to an order of the UE in the second ordering sequence and the DMRS port indication table.

8. A base station, comprising one or more processors and a memory storing computer-readable operation instructions, wherein when the computer-readable operation instructions in the memory are run, the processor is configured to:

allocate a specified DMRS port to User Equipment (UE) according to a DMRS port indication table, wherein all combinations of UE downlink transmission layer numbers and corresponding DMRS ports, in case that a Physical Downlink Shared Channel (PDSCH) is punctured and is not punctured are recorded in the DMRS port indication table; and send DMRS port indication information to the UE according to information of the DMRS port allocated to the UE, the DMRS port indication information comprising 4 bits, wherein the 4 bits comprise a first control bit indicating whether the PDSCH of the UE in the DMRS port indication table is punctured or not and other 3 second control bits indicating the UE downlink transmission layer numbers and corresponding DMRS ports in the DMRS port indication table.

9. The base station according to claim 8, wherein the DMRS port indication information comprises the following indication states:

a first state in which the first control bit indicates that the PDSCH of the UE in the DMRS port indication table is not punctured in case of single-codeword transmission;

a second state in which the first control bit indicates that the PDSCH of the UE in the DMRS port indication table is not punctured in case of double-codeword transmission;

a third state in which the first control bit indicates that the PDSCH of the UE in the DMRS port indication table is punctured in case of single-codeword transmission;

a fourth state in which the first control bit indicates that the PDSCH of the UE in the DMRS port indication table is punctured in case of double-codeword transmission.

10. The base station according to claim 9, wherein the first state comprises: a first sub-state in which the second control bits indicate, in the DMRS port indication table, combination information of single-layer transmission of the UE and each DMRS port, a second sub-state in which the second control bits indicate, in the DMRS port indication table, combination information of UE downlink retransmission layer numbers and each DMRS port, and a third sub-state in which the second control bits indicate that a reserved place is set in the DMRS port indication table;

the second state comprises: a fourth sub-state in which the second control bits indicate, in the DMRS port indication table, combination information of 2-to-4-layer transmission of the UE and each DMRS port, and a fifth sub-state in which the second control bits indicate, in the DMRS port indication table, combination information of 5-to-8-layer transmission of the UE and each DMRS port;

the third state comprises: a sixth sub-state in which the second control bits indicate, in the DMRS port indication table, combination information of single-layer transmission of the UE and each DMRS port; and the fourth state comprises: a seventh sub-state in which the second control bits indicate, in the DMRS port indication table, combination information of 2-to-4-layer transmission of the UE and each DMRS port, wherein the first sub-state and the fourth sub-state both indicate that a total downlink transmission layer number is less than or equal to 4; and the fifth sub-state, the sixth sub-state and the seventh sub-state indicate that the total downlink transmission layer number is more than or equal to 5.

11. The base station according to claim 10, wherein the processor is further configured to:

when the UE only supports single-layer transmission and a current total downlink transmission layer number is less than or equal to 4, allocate a DMRS port indicated to be a combination in the first sub-state to the UE according to the DMRS port indication table;

when the UE requires retransmission, allocate a DMRS port indicated to be a combination in the second sub-state to the UE according to the DMRS port indication table;

when the UE supports 2-to-4-layer transmission and the current total downlink transmission layer number is less than or equal to 4, allocate a DMRS port indicated to be a combination in the fourth sub-state to the UE according to the DMRS port indication table;

when there is only one piece of UE performing transmission, the UE supports 5-to-8-layer transmission and the current total downlink transmission layer number is more than or equal to 5, allocate a DMRS port indicated to be a combination in the fifth sub-state to the UE according to the DMRS port indication table;

when the UE only supports single-layer transmission and the current total downlink transmission layer number is more than or equal to 5, allocate a DMRS port indicated to be a combination in the sixth sub-state to the UE according to the DMRS port indication table;

when the UE supports 2-to-4-layer transmission and the current total downlink transmission layer number is less than or equal to 5, allocate a DMRS port indicated to be a combination in the seventh sub-state to the UE according to the DMRS port indication table; and when a specific DMRS port is required to be allocated to the UE, send the DMRS port indication information indicated to be in the third sub-state to the UE according to the DMRS port indication table.

12. The base station according to claim 8, wherein the processor is further configured to:

when there exists multiple pieces of UE, perform descending ordering on UEs to obtain a first ordering sequence according to a maximum downlink transmission layer number currently supported by the UEs; and allocate a corresponding DMRS port to each piece of UE according to an order of the UE in the first ordering sequence and the DMRS port indication table.

13. The base station according to claim 8, wherein the processor is further configured to:

when there exists multiple pieces of UE, perform ascending ordering on the UEs to obtain a second ordering sequence according to a maximum downlink transmission layer number currently supported by the UEs; and allocate a corresponding DMRS port to each piece of UE according to an order of the UE in the second ordering sequence and the DMRS port indication table.

* * * * *